Patented May 22, 1945

2,376,430

UNITED STATES PATENT OFFICE 2,376,430

DERIVATIVES OF 4:4'-DIAMINODIPHENYL-SULPHONES AND PROCESS OF MAKING SAME

Max Hartmann and Jean Druey, Riehen, Switzerland, assignors to Ciba Pharmaceutical Products, Incorporated, Summit, N. J., a corporation of New Jersey No Drawing. Application May 24, 1943, Serial No. 488,258. In Switzerland June 6, 1942

7 Claims. (Cl. 260—397.6)

It is known that 4:4'-diaminodiphenylsulphone is effective in coccus infections but is very toxic, a fact which limits its use. A number of attempts have been made to overcome this difficulty by introducing radicals into one or both of the amino groups of the 4:4'-diaminodiphenylsulphone.

It has now been found that active, and at the same time considerably less toxic, new derivatives of 4:4'-diaminodiphenylsulphone can be obtained by allowing 4:4'-diaminodiphenylsulphones which contain at least one unsubstituted amino group to react with acetaldehyde-disulphonic acids or their derivatives. Particularly valuable compounds are obtained if 4:4'-diaminodiphenylsulphones, in which an amino group is substituted, e. g. with an acid radical such as the acetic acid or the carbamic acid radical, are used as starting products.

Acetaldehyde-disulphonic acids or their derivatives or salts, respectively, e. g. acetaldehyde-disulphonic acid sodium, bromacetaldehyde-disulphonic acid sodium, etc., are used for the reaction, which is carried out in a known manner. The sulphones are reacted, for example, with the disodium salt of acetaldehyde-disulphonic acid in water at increased temperature and the sodium salts then isolated in the usual way.

The compounds obtained by the present process are intended for therapeutic use.

The following examples illustrate the invention, but are not to be regarded as limiting it in any way, the parts being by weight:

Example 1

27 parts of the disodium salt of acetaldehyde-disulphonic acid and 27 parts of 4-amino-4'-acetylamino-diphenylsulphone are heated to gentle boiling in a mixture of 200 parts of water and 150 parts of alcohol, when solution gradually occurs. On precipitating from the hot solution with 1000 parts of alcohol, the condensation product is obtained which has the formula:

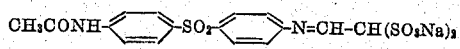

Yield about 38 parts. The product is fairly easily soluble in water.

Example 2

82 parts of the barium salt of acetaldehyde-disulphonic acid are dissolved in 1000 parts of hot water, and 30 parts of dry sodium sulphate added. The precipitated barium sulphate is separated off and the solution heated on a water bath with 24 parts of p:p'-diaminodiphenyl-sulphone until the latter is all dissolved. The water is then distilled off in vacuo. The residual tetrasodium salt of the formula:

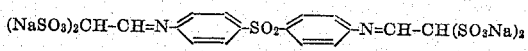

crytallizes out after standing for some time.

In a similar way other salts, e. g. the calcium salt or salts with organic bases can be obtained.

What we claim is:

1. A therapeutically active compound selected from the group consisting of the 4:4'-diaminodiphenylsulphones, in which at least one amino group is substituted by a β:β-disulphoethylidene group, and their salts.

2. A therapeutically active 4-amino-4'-acylaminodiphenylsulphone, in which the amino group in 4-position is substituted by a β:β-disulphoethylidene group.

3. A therapeutically active salt of a 4-amino-4'-acylamino-diphenylsulphone, in which the amimo group in 4-position is substituted by a β:β-disulphoethylidene group.

4. The therapeutically active compound of the formula

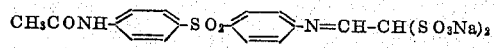

5. A process for the manufacture of a therapeutically active derivative of 4:4'-diaminodiphenylsulphone, which comprises causing a 4:4'-diaminodiphenylsulphone, which contains at least one unsubstituted amino group, to react with a member of the group consisting of brom-acetaldehyde disulphonic acid, acetaldehyde disulphonic acid, and their salts.

6. A process for the manufacture of a therapeutically active derivative of 4:4'-diaminodiphenylsulphone, which comprises causing a 4-amino-4'-acylamino-diphenylsulphone to react with a member of the group consisting of brom-acetaldehyde disulphonic acid, acetaldehyde disulphonic acid, and their salts.

7. A process for the manufacture of a therapeutically active derivative of 4:4'-diaminodiphenylsulphone, which comprises causing a 4:4'-diaminodiphenylsulphone, which contains at least one unsubstituted amino group, to react with the disodium salt of acetaldehyde disulphonic acid.

MAX HARTMANN.
JEAN DRUEY.